(12) United States Patent
Vöhringer

(10) Patent No.: US 12,543,664 B2
(45) Date of Patent: Feb. 10, 2026

(54) DEVICE FOR FORMING A CANOPY

(71) Applicant: VOEN VÖHRINGER GMBH & CO. KG, Fronreute-Blitzenreute (DE)

(72) Inventor: Reinhard Vöhringer, Berg (DE)

(73) Assignee: VOEN VÖHRINGER GMBH & CO. KG, Fronreute-Blitzenreute (DE)

( * ) Notice: Subject to any disclaimer, the term of this patent is extended or adjusted under 35 U.S.C. 154(b) by 0 days.

(21) Appl. No.: 19/052,748

(22) Filed: Feb. 13, 2025

(65) Prior Publication Data

US 2025/0194475 A1 Jun. 19, 2025

Related U.S. Application Data

(63) Continuation of application No. PCT/EP2023/070677, filed on Jul. 26, 2023.

(30) Foreign Application Priority Data

Aug. 18, 2022 (DE) ...................... 10 2022 120 881.8
Apr. 5, 2023 (DE) ...................... 10 2023 108 768.1

(51) Int. Cl.
A01G 13/21 (2025.01)
A01G 9/24 (2006.01)
(Continued)

(52) U.S. Cl.
CPC ............. *A01G 13/21* (2025.01); *A01G 9/242* (2013.01); *A01G 9/243* (2013.01); *A01G 13/262* (2025.01);
(Continued)

(58) Field of Classification Search
CPC ........................ A01G 13/21; A45B 2200/1027
See application file for complete search history.

(56) References Cited

U.S. PATENT DOCUMENTS 11,684,026 B2 *  6/2023  Daios ..................... A01G 13/21
                                                    47/31.1
2008/0148631 A1 * 6/2008  Wan ........................ H02S 20/30
                                                    47/20.1
(Continued)

FOREIGN PATENT DOCUMENTS

CN      203129693 U     8/2013
CN      105552151 A     5/2016
(Continued)

OTHER PUBLICATIONS

International Search Report and Written Opinion (Application No. PCT/EP2023/070677) dated Jan. 22, 2024 (25 pages).
(Continued)

*Primary Examiner* — Robert Canfield
(74) *Attorney, Agent, or Firm* — BURR PATENT LAW, PLLC

(57) ABSTRACT

The invention relates to a device for forming a canopy over a region in the outdoors, comprising a flat element and a support assembly with supports, wherein the support assembly can be anchored to a ground surface of the region, and wherein the flat element supported by the support assembly functions to form an areal protective canopy over the region, wherein a section of the flat element extends along a ridge region of the protective canopy. According to the invention, a solar cell module is provided, which is connected to the flat element, such that, with light irradiation on the solar cell module, light energy can be converted into electrical energy, wherein a quick-closure mechanism comprising zip-closure mechanism with a zip-closure unit are provided, in order to detachably arrange a solar cell module on the flat element using the zip closure mechanism.

24 Claims, 6 Drawing Sheets

(51) Int. Cl.
*A01G 13/26* (2025.01)
*E04H 4/10* (2006.01)
*E04H 6/02* (2006.01)
*H02S 30/20* (2014.01)

(52) U.S. Cl.
CPC .............. *E04H 4/10* (2013.01); *E04H 6/025* (2013.01); *A45B 2200/1027* (2013.01)

(56) References Cited

U.S. PATENT DOCUMENTS

| | | | |
|---|---|---|---|
| 2010/0089433 A1 | 4/2010 | Conger | |
| 2011/0005560 A1 | 1/2011 | Nair | |
| 2012/0103377 A1* | 5/2012 | Sheridan | E04H 15/58 135/96 |
| 2013/0032186 A1 | 2/2013 | Lin | |
| 2015/0201565 A1* | 7/2015 | Toye | A01G 13/21 47/29.1 |
| 2019/0053439 A1* | 2/2019 | Daios | F16B 5/12 |
| 2019/0119944 A1* | 4/2019 | Reboldi | A01G 9/22 |
| 2022/0167570 A1* | 6/2022 | Daios | A01G 13/21 |
| 2023/0140009 A1 | 5/2023 | De Campos et al. | |
| 2023/0148407 A1* | 5/2023 | Daios | A01G 13/21 47/31.1 |
| 2023/0148487 A1* | 5/2023 | Croce | A01G 7/00 47/21.1 |
| 2023/0371448 A1* | 11/2023 | Daios | A01G 13/21 |
| 2024/0204722 A1* | 6/2024 | Kroyzer | H02S 40/10 |
| 2024/0243692 A1* | 7/2024 | Balz | F24S 20/67 |
| 2024/0313696 A1* | 9/2024 | Shafat | H02S 20/00 |
| 2024/0417991 A1* | 12/2024 | Lakshminarayanan | E04H 6/04 |

FOREIGN PATENT DOCUMENTS

| | | |
|---|---|---|
| CN | 107711190 A | 2/2018 |
| DE | 10 2012 016 671 A1 | 5/2014 |
| DE | 10 2013 006 530 A1 | 10/2014 |
| EP | 3 248 455 A1 | 11/2017 |
| JP | 2004-036098 A | 2/2004 |
| WO | 2013/056285 A2 | 4/2013 |
| WO | 2013/162376 A1 | 10/2013 |
| WO | 2021/075640 A1 | 4/2021 |
| WO | 2021/146787 A1 | 7/2021 |

OTHER PUBLICATIONS

International Preliminary Examination Report (with Chapter II Claims) (Application No. PCT/EP2023/070677) dated Sep. 12, 2024 (with English translation) (41 pages).

* cited by examiner

DEVICE FOR FORMING A CANOPY

CROSS REFERENCE TO RELATED APPLICATIONS

This application is a continuation of International Application No. PCT/EP2023/070677 filed Jul. 26, 2023, which designated the United States, and claims the benefit under 35 USC § 119(a)-(d) of German Application No. 10 2022 120 881.8 filed Aug. 18, 2022, and German Application No. 10 2023 108 768.1 filed Apr. 5, 2023, the entireties of which are incorporated herein by reference.

FIELD OF THE INVENTION

The present invention relates to a device for forming a canopy.

BACKGROUND OF THE INVENTION

Canopy systems, for example, of lightweight design, are frequently used in commercially exploited areas such as cultivation areas for arable crops or agricultural crops or other areas, in order to provide a protective canopy above the region to be protected.

The canopy which can be provided in this way and, in particular, can be adapted and dismantled serves, for example, to protect agricultural regions against weather conditions, birds or insects and/or to protect the crops against weather-induced damage such as frost, hail, rain damage and/or to protect against bacterial or fungus-induced plant diseases.

Moreover, climate change presents a multiplicity of companies in the agricultural sector with growing problems in this context.

Here, global developments with regard to efficient and ecologically advantageous energy provision also play an ever greater role.

JP 2004036098 A, CN 203129693 U, US 2013/032186 A1, CN 105552151 A, WO 2013/162376 A1, WO 2021/14787 A1 and WO 2013/056285 A2 are cited in respect of the prior art.

SUMMARY OF THE INVENTION

It is an object of the present invention to provide a device for forming a canopy over regions of the type described in the introduction such as canopy systems for agriculture, in a technically efficient and economically advantageous manner. In particular, local and global challenges with regard to climate change and ecological energy generation strategies away from fossil fuels are to be solved in a real-world manner.

The present invention proceeds from a device for forming a canopy over an outdoor region, such as cultivation areas for arable crops or agricultural crops, or other commercially exploited areas, comprising a panel element and a supporting arrangement with supports, wherein the supporting arrangement can be anchored on a ground area of the region, and wherein the panel element which is supported by the supporting arrangement serves to form a flat protective canopy above the region, wherein a portion of the panel element extends along a ridge region of the protective canopy. For example, an edge portion of the panel element extends along the ridge region.

The supports which are spaced apart from one another extend downward in the vertical direction, for example, from the ground area, as far as into the ridge region of the device. In the ridge region, a ridge element, which is elongate transversely with respect to the vertical, of the supporting arrangement is present offset in the ridge region vertically with respect to the ground area. For example, the ridge element is received at the upper ends so as to run between upper ends of the supports which are spaced apart.

For example, the protective canopy serves to form a canopy over arable crops such as crop plants, fruit plants, vegetable plants, forage crops or plants as energy resource. For example, the protective canopy is a film canopy. For example, the protective canopy does not have any rigid struts or profiles in its surface area. For example, the protective canopy is braced and/or stretched spatially by tensile forces which act on the edge side.

The vertical direction is, in particular, a height direction of the device. The ridge element such as, for example, a wire, a wire cable, a plastic cable and/or a rod-shaped elongate profile runs at least approximately in the horizontal direction and can absorb forces in the longitudinal and/or transverse direction of the ridge element. For example, the ridge element is present in a tightly stretched state. For example, the protective canopy is spread out and stretched above or over the region or the outdoor protective or usage region.

For example, one side of the panel element extends with, for example, a straight longitudinal or transverse edge of the panel element along the ridge element. For example, the relevant side forms an upper ridge-side edge of one side of a region, extending over the length of the ridge element, of the panel element or protective canopy. As a rule, part regions of the panel element or of the protective canopy are each present on the ridge element laterally on both sides over the length of the ridge element, for example, in each case inclined downward with respect to the horizontal. For example, the protective canopy has the shape of an equilateral ridge roof in relation to a ridge element. For example, an outline of the panel element or the protective canopy is quadrilateral such as, for example, rectangular.

For example, the panel element has a single layer or multiple layers or multiple plies. For example, the panel element is formed from precisely two plies or layers, an upper-side and a lower-side ply or layer. For example, the panel element is formed from precisely three plies. The plies are formed, for example, in a layer-like manner, for example lying above one another.

For example, the panel element comprises a film such as a plastic film. For example, the panel element comprises precisely one contiguous film. For example, the panel element comprises a net element such as, for example, a mesh fabric. For example, the panel element comprises precisely one contiguous net element such as a mesh fabric. For example, there is precisely one film layer above the net element on precisely one lower net element. For example, the film has a plurality of parallel film strips. For example, the net element is of continuous or single-part configuration.

For example, the plurality of layers or the plurality of plies of the panel element are each designed as a thin flat closed or perforated material. For example, the panel element comprises a film, a net element, a textile material or a nonwoven. The panel element is flexible or deformable, for example can be rolled up and unrolled. For example, the film is transparent or partially transparent. For example, the film has a thickness between 0.1 mm and 3 mm.

For example, the panel element comprises precisely one lower net element or precisely one net such as a protective hail or insect net. For example, the panel element comprises a layer below the net element. For example, the panel element comprises precisely one lower net element, for example, continuously flat or single-part or single-piece, and a film which is present above it, for example, lies on it. For example, the film forms precisely one layer above the net element, possibly overlapping only slightly on the edge side with respect to an adjacent film strip. For example, the film is multiple-part, for example, is formed from a plurality of parallel film strips. For example, the plurality of film strips are rectangular in outline and present next to one another and do not overlap or overlap only on the edge side. For example, as an alternative, the film is formed in one piece in a contiguous manner, for example, over the entire protective canopy. For example, the film is formed in one part, for example, over an entire half area of a ridge roof-shaped protective canopy, or over half or one inclined side of the ridge roof-shaped protective canopy.

For example, the panel element comprises precisely one ply made from one material, or two or more plies or layers made from materials, and comprises, for example, a plurality of upper parallel rectangular film strips, for example, overlapping slightly on the edge side, and underneath a carrier such as, for example, a net for, for example, a protective hail or insect net.

A film strip is fixed, for example, along a longitudinal edge thereof on the carrier below such as, for example, a net carrier. For example, a longitudinal edge, which lies opposite the fixed longitudinal edge, of the film strip can be deflected upward in a reversible manner by wind or thermal, for example, in a freely movable manner.

According to the present invention, the device is an agricultural canopy system such as, for example, a canopy system for arable crops or fruit and/or vegetables.

One aspect of the present invention lies in the fact that a solar cell module is provided which is connected to the panel element, with the result that light energy can be converted into electrical energy in the case of the irradiation of light onto the solar cell module, wherein quick action closure mechanisms are provided comprising a zipper mechanism with a zipper unit, in order to arrange a solar cell module on the panel element releasably by way of the zipper mechanism.

Different advantages for everyday practice can be achieved in this way.

Zipper mechanisms can be readily operated intuitively and manually by every person, since zipper mechanisms belong to objects of everyday usage.

One possibility, provided by way of the solar cell module, of ecological energy generation is implemented by way of the attached solar cell module integrally in the canopy system, for example, in a canopy system which is otherwise of customary design. For example, the solar cell module can be integrated into a customarily designed device for forming a canopy. Existing and known devices for forming a canopy can be used for energy use by way of photovoltaics with little effort and/or without substantial amendment measures. Merely the zipper mechanisms have to be implemented. For example, the supporting arrangement of known canopy systems or devices can be used in the existing configuration or identically, and an existing panel element can be used for arranging the solar cell module.

For example, the solar cell module is a thin, flat component.

The solar cell module can be attached in the case of all devices which, for example, are used for agricultural crop protection, regardless of which region or crop is specifically provided with a canopy. The solar cell module can be used variably or universally regardless of the specifically installed type of panel element such as film panel elements, protective hail and/or insect panel elements, specifically can be integrated releasably by way of zipper mechanisms.

For example, the solar cell module can be selectively attached or installed in the canopy device in a rapid and uncomplicated manner. When not in use or for other reasons, for example, the solar cell module can be removed from the canopy and/or replaced, for example, for repair purposes, and/or can be attached to another canopy device or, for example, can be stowed.

Moreover, the year-round use of the solar cell module is associated with the solar cell module as part of the canopy; for example, even in a dual function, for example, if the solar cell module serves as a protective shell for a region of the panel element which is held in a compressed state below it, in addition to the function of a year-round production of electrical energy. For example, an otherwise or previously necessary, winter stowage and storage of the panel element at another location, which is complicated, can then also be dispensed with on account of the solar cell module.

For example, the solar cell module is present so as to lie in a directly adjacent manner on an upper side of a portion of the panel element. For example, the solar cell module is arranged releasably on the panel element exclusively via the zipper mechanism or solely via the zipper mechanism.

For example, the upper side of the portion of the panel element is configured, for example, flatly in one plane. For example, the solar cell module is generally speaking present on the device in the energy generation state in a manner which is oriented in a flat and planar way. For example, remaining portions of the protective canopy are likewise present in a stretched state regardless of the solar cell module which, for example, is present in a flatly stretched state.

For example, the upper side of the portion of the panel element and, therefore, the solar cell module which is present thereon in a releasably connected manner are oriented outward toward the atmosphere and, therefore, toward the sun. The spatial orientation of the attached solar cell modules such as, for example, the inclination with respect to the horizontal is advantageously adapted to the irradiation of sunlight for optimum performance of the solar cell. The solar cell module is present on the outside above a region of the panel element and such that it covers the latter. For example, the solar cell module can be integrated into the panel element in the stretched state in accordance with the flat extent or a plane which is formed. For example, the plane which is formed by the solar cell module is, for example, parallel to a plane defined by the panel element which is spread out flatly. For example, the solar cell module and the panel element portion which lies below it form a multiple layer construction such as, for example, a two-layer or three-layer or four-layer construction.

In the case of the protective canopy, for example, the solar cell module forms a part surface region of the panel element or an upper-side or outer-side part region of the protective canopy. For example, the solar cell module is strip-shaped as a contiguous functional unit for energy conversion. The length of the solar cell module is, for example, equal to or approximately corresponding to a length of the contiguous unit of the panel element or the relevant portion of the panel element. For example, the length of the solar cell module corresponds to a part length of the contiguous unit of the panel element or the relevant portion of the panel element.

For example, a zipper unit has a slide and two elongate side parts which can be hooked releasably to one another.

For example, the zipper mechanisms are configured as connecting means which function in accordance with the principle of a zipper. For example, the zipper mechanism can also be understood as zip closure mechanism with a zip closure unit. The zipper mechanism can be obtained in a very wide variety of configurations as a proven, robust standard product. The zipper mechanisms are a closure mechanism which is simple to open and is based on a positively locking connection. For example, a longitudinal axis of the zipper unit extends in the longitudinal direction of the ridge element, for example, horizontally and/or in parallel with respect to the longitudinal axis of the ridge element.

For example, a longitudinal axis of the zipper unit extends in the vertical direction and/or transversely with respect to the longitudinal direction of the ridge element. For example, a solar cell module has precisely one zipper unit or precisely two zipper units or more than two zipper units. For example, a solar cell module has a first zipper unit and a second zipper unit. For example, the longitudinal axis of the first zipper unit is oriented parallel to the longitudinal axis of the second zipper unit. For example, the longitudinal axis of the first zipper unit is not oriented in parallel, for example, transversely with respect to the longitudinal axis of the second zipper unit. For example, in the case of a solar cell module with a rectangular outline, there are two zipper units which are spaced apart and offset in parallel, the longitudinal axes of which are in parallel.

For example, in the case of a solar cell module with a rectangular outline, there are two first zipper units which are spaced apart, are offset in parallel, and the longitudinal axes of which are parallel to one another, and there are additionally two further zipper units which are spaced apart, are offset in parallel, and the longitudinal axes of which are parallel to one another and transverse with respect to the longitudinal axes of the first the zipper units. For example, the zipper mechanism form a frame-like arrangement on the outside along the edges of the solar cell module.

A solar cell module is, for example, a unit which is configured to convert light energy into electrical energy or is suitable for electricity generation. For example, the solar cell module comprises precisely two or more than two subunits, or a plurality of subunits which form the solar cell module can interact for electricity generation, for example, can be connected together electrically.

For example, precisely one zipper unit is provided for a plurality of solar cells subunits which are connected together, or there are a plurality of zipper units for a plurality of solar cells subunits which are connected together.

A further aspect of the present invention is to be seen in the fact that a solar cell module is provided which is connected to the panel element, with the result that light energy can be converted into electrical energy in the case of the irradiation of light onto the solar cell module, wherein quick action closure mechanisms are provided comprising hook and loop fastener mechanism with a hook and loop fastener unit, in order to arrange a solar cell module on the panel element releasably by way of the hook and loop fastener mechanism.

In this way, the connection can be reversibly configured or closed and canceled again or released rapidly, simply and as often as desired by way of the hook and loop fastener mechanism. This takes place, for example, manually, intuitively and with few manual steps.

For example, a hook and loop fastener unit has two flat flexible hook and loop strips which can be hooked releasably to one another in a reversible manner. A hook and loop fastener unit is, for example, of strip-shaped or flat configuration. The two hook and loop strips comprise, for example, a first hook and loop strip with flexible loops, for example, a fleece tape. The two hook and loop strips comprise, for example, a second hook and loop strip with small flexible barbs, for example, a hook tape. The first hook and loop strip can be hooked reversibly to the second hook and loop strip, for example, by being pressed onto one another. For example, one hook and loop strip of the hook and loop fastener unit is attached, for example, non-releasably to the panel element. For example, a first or second hook and loop strip of the hook and loop fastener unit is sewn, adhesively bonded, welded, or attached in one piece to the panel element. This applies correspondingly to the attachment of the other hook and loop strip, for example, of the second or first hook and loop strip of the hook and loop fastener unit to the solar cell module.

The alignment or arrangement of a hook and loop fastener unit is, for example, in the longitudinal direction of the ridge region or with respect to the longitudinal direction of the ridge element. The orientation or arrangement of a hook and loop fastener unit is, for example, transverse or oblique with respect to the longitudinal direction of the ridge region or with respect to the longitudinal direction of the ridge element. For example, a hook and loop fastener unit extends along a longitudinal edge of the solar cell module or a panel element or along the longitudinal edge of a strip-shaped region of the panel element.

It is possible, for example, for a plurality of hook and loop fastener units with a mutually identical and/or different orientation to be provided for the connection of a solar cell module to the panel element. For example, precisely one hook and loop fastener unit is provided per solar cell module for the connection to the panel element. For example, precisely two or precisely three or precisely four hook and loop closure units are provided per solar cell module for the connection to the panel element.

The solar cell module is, for example, of flexible configuration. For example, the solar cell module has a variable-shape behavior, without the function of the energy conversion and/or energy provision suffering. For example, the solar cell module can be folded up in a space-saving manner. For example, the solar cell module is configured such that it is at least partially foldable, elastic, rollable and/or gatherable. For example, the solar cell module is configured with a comparatively small thickness in the millimeter range. For example, the solar cell module has a thickness in the single-digit or two-digit millimeter range. For example, the solar cell module can be provided such that it is spread out flatly.

For example, the solar cell module is configured as a film module.

For example, the solar cell module is of flexible configuration.

For example, the solar cell module can be configured or is configured as a panel module.

For example, the solar cell module can be configured or is configured as a wound module.

For example, the solar cell module is configured such that it can be rolled together or rolled up and can be unrolled again. For example, the solar cell module in the rolled-up form can be provided rolled up, for example, as a reel. The rolled-up solar cell module can be provided in a compact and/or space-saving manner, for example, for storage or transport.

For example, the solar cell module can selectively be spread out flatly as a panel element, for example, in the arranged state on the constructed device. For example, the solar cell module can selectively be provided, for example, in a separate manner from the panel element as a reel or in a compact manner which is folded multiple times. For example, the solar cell module is designed as a multiple layer module.

For example, the solar cell module comprises a thin layer solar cell, for example, a silicon solar cell, comprising a photoelectrically active layer and a carrier layer. For example, the carrier layer provides mechanical stability of the solar cell module, for example, a carrier layer component.

The solar cell module is configured, for example, with a solar cell layer component or with a photovoltaic layer component or a PV layer component, and a carrier layer, for example, a carrier layer component, on or to which the solar cell layer component is attached.

For example, there is one side part of the zipper unit and/or one hook and loop strip of the hook and loop fastener unit on the carrier layer, for example sewn, welded, melted and/or adhesively bonded on the carrier layer. For example, one edge of the carrier layer projects beyond an edge of the solar cell or the thin-layer solar cell, wherein one side part of the zipper unit and/or one hook and loop strip of the hook and loop fastener unit are/is present on the projecting edge. For example, the carrier layer comprises a film material or a woven fabric material.

For example, the carrier layer and the solar cell layer component are of flexible design. For example, both the carrier layer and the solar cell layer component are connected to one another, for example, adhesively bonded, over the full area or in a punctiform or linear manner.

The solar cell module is, in particular, a photovoltaic module. For example, the solar cell module is a thin layer element. For example, the solar cell module is, for example, a film layer element or a textile or film component or a film element, for example a film component. The solar cell part is integrated into or applied to a carrier or the carrier layer such as, for example, a film.

For example, the solar cell module is designed as a photovoltaic module, PV module, for example, as a photovoltaic film, as a PV film, a PV film module or as a solar cell module.

For example, the solar cell module is configured flatly with a panel side or upper side which serves to convert light energy and is directed outward in the attached state of the solar cell module to the device.

For example, the solar cell module is connected releasably to the panel element via an edge region of the solar cell module by means of the zipper mechanism. As an alternative or in addition, for example, the solar cell module is connected releasably to the panel element via an edge region of the solar cell module by means of the hook and loop fastener mechanism.

This is particularly practicable in order to operate the zipper mechanism or the hook and loop fastener mechanism. Moreover, this solution makes secure fastening of the solar cell module to the panel element possible. The type, positioning, number and/or dimensions of the zipper mechanism or their zipper units and/or the hook and loop fastener mechanism or their hook and loop fastener units are selected so as to be coordinated in a fitting manner for this purpose. For example, these parameters are dependent, for example, on the size or the dimensions, the weight and/or the shape of the solar cell module.

For example, precisely one solar cell module with precisely one zipper unit is provided on the device or on a panel element or a panel element portion.

For example, precisely one solar cell module with precisely one hook and loop fastener unit is provided on the device or on a panel element or a panel element portion.

For example, the solar cell module is connected releasably, for example connected in a linear manner, to the panel element along two opposite edges of the solar cell module. For example, the solar cell module has a substantially polygonal or quadrangular, such as rectangular, outline. For example, the solar cell module has a quadrangular or rectangular outer contour in the basic shape.

For example, one side part of the zipper unit is attached to the panel element, for example, non-releasably. For example, one side part of the zipper unit is sewn, adhesively bonded, welded or attached in one piece to the panel element. This applies correspondingly to the attachment of the other side part to the panel element.

For example, a hook and loop fastener unit has two hook and loop strips which can be hooked releasably to one another. The two hook and loop strips comprise, for example, a hook and loop strip with flexible loops, for example, a fleece tape. The two hook and loop strips comprise, for example, a hook and loop strip with small flexible barbs, for example, a hook tape. For example, one hook and loop strip of the hook and loop fastener unit is attached to the panel element, for example, non-releasably. For example, one hook and loop strip of the hook and loop fastener unit is sewn, adhesively bonded, welded or attached in one piece to the panel element. This applies correspondingly to the attachment of the other hook and loop strip of the hook and loop fastener unit to the panel element.

For example, as an alternative, one side part of the zipper unit is attached to the panel element in a manner which is releasable or separable without destruction, for example, hooked in. This applies correspondingly to the attachment of the other side part to the panel element if it is not attached non-releasably.

In accordance with a further example, a zipper unit has a slide and two elongate side parts which can be hooked releasably to one another, wherein there is one side part of the zipper unit on the solar module, and there is another side part of the associated zipper unit on the panel element. For example, the side parts comprise flat flexible tapes, for example, woven fabric tapes.

For example, the zipper unit is a customary zipper unit or a standard zipper unit. For example, the two side parts are thin and flexible. For example, the two side parts are configured as elongate and narrow parts which interact via the slide and can be separated and interlocked. For example, the two side parts are present by way of the zipper unit in such a way that the two side parts provide the releasable arrangement of the solar module on the panel element in a functionally correct manner, in accordance with the function of the zipper mechanism. A zipper unit comprises the slide and the two elongate side parts which can be interlocked with one another. For example, each side part has a multiplicity of hook-in members which are configured on it and are arranged at regular intervals. The hook-in members are, for example, tooth-like. By way of the slide, the hook-in members of the one side part can be interlocked with the hook-in members of the other side part and can be released from them again. In the interlocked state of the hook-in members, the two side parts are connected fixedly to one another.

For example, it is such that the zipper mechanism have two zipper units which each function independently of one another, for a releasable arrangement of the solar cell module on the panel element. The two zipper units function separately, for example. For example, precisely two zipper units or the more than precisely two zipper units are each present separately from one another. For example, the two or the plurality of zipper units are all of identical construction. For example, the precisely two zipper units have the same length. For example, the two or the plurality of zipper units differ among one another, for example, in terms of the type and/or the length.

For example, precisely one solar cell module with precisely two zipper units is connected releasably to the panel element. For example, the precisely two or more than two zipper units are present separately from one another per solar cell module, and are each of continuous design. For example, a solar cell module is connected to the panel element by means of precisely two zipper units which, in the region of opposite edges of the solar cell module, connect the latter to the panel element.

A first zipper unit has a side part on a first edge of the solar cell module, and the associated other side part of the zipper unit is present on the panel element.

A second zipper unit has a side part on a second edge of the solar cell module, and the associated other side part of the zipper unit is present on the panel element.

Accordingly, the two side parts are present on the panel element at a spacing corresponding to a spacing of the associated side parts on the solar cell module.

For example, precisely one solar cell module is connected to precisely one panel element, for example, is connected to precisely one panel element portion. For example, the panel element portion is fixed spatially. For example, the panel element portion has a strip-shaped film portion which is the next or uppermost in the direction of the ridge region. For example, the panel element portion is a film portion which is fastened at two opposite edges such as, for example, longitudinal edges to a carrier of the panel element, such as a carrier net. As a result, the portion is spatially oriented so as to substantially always be constant, since the carrier and the film are spread out in a braced manner on the protective canopy. For example, the carrier forms a stretched lower side of the panel element. For example, the carrier is stretched flatly by, for example, tensioning means such as tensioning wires. A spatial orientation of the fastened solar cell module is at least substantially maintained on the panel element or on the flat protective canopy. In this way, an optimum performance of the solar cell module for electricity generation is ensured even, for example, in the case of wind.

For example, a portion of the panel element which is adjacent to the solar cell module has a film portion which is fixed, for example, by way of a longitudinal edge of the film portion on the carrier and is not connected to the carrier at another edge such as, for example, an opposite longitudinal edge of the film portion. In this way, the adjacent portion or the film portion can be folded up on one side from the carrier, which is brought about by wind or thermals, for example.

One exemplary variant is distinguished by the fact that two zipper units are provided in such a way that a releasable arrangement of opposite edges of the solar cell module on the panel element is configured.

For example, precisely two zipper units are present for precisely one solar cell module. If, for example, a plurality of solar cell modules are present on the panel element, precisely two zipper units are provided, for example, for each individual solar cell module or for in each case precisely one solar cell module. In the case of the two zipper units, the two zipper units are spaced apart spatially on the solar cell module and on the panel element. For example, the two zipper units act separately or independently from one another. Each individual zipper unit is present such that it can be operated in each case separately from other zipper units such as, for example, it can be pulled open or pulled closed or is in the open, partially open or closed state.

For example, precisely one zipper unit and precisely one hook and loop fastener unit are provided for the releasable attachment of the solar cell module to the panel element. For example, all other combinations of the number of zipper units and hook and loop fastener units are also possible for attaching the solar cell module to the panel element.

A respective zipper unit is closed if the two side parts are interlocked with one another, whereby the solar cell module can generate or provide electrical energy during operation of the protective canopy. The actual basic function of the spread-out protective canopy is maintained permanently and completely, independently of the presence of the solar cell module. In the case of a solar cell module which is arranged on the panel element, in the case of the irradiation of light, electrical energy is provided, for example, for electric loads in the vicinity of the protective canopy and/or for feeding current or electrical energy into an energy supply network or into an energy storage unit.

According to the present invention, the solar cell module is present in a region of the device which is adjacent to a ridge element of the ridge region. The solar cell module is present in a strip of the panel element which runs parallel to the ridge element, adjacently with respect to the ridge element in this strip. For example, one edge of the solar cell module adjoins the ridge region. For example, one edge of the solar cell module adjoins the ridge region directly or offset somewhat with respect to an upper end of the ridge region, for example, offset downward by from 5 to 10 cm with respect to the upper end of the ridge element.

For example, the ridge region extends in the longitudinal direction of the ridge element. For example, the ridge element is strip-shaped, for example, from 40 cm to 60 cm wide, for example 55 cm wide. For example, the ridge region has opposite longitudinal edges, wherein one longitudinal edge faces the ridge element, for example, extends along the ridge element, for example, extends parallel to the longitudinal axis of the ridge element.

For example, a region, which is covered by the arranged solar cell module, of an overall area of the protective canopy is between 5% and 100% of the overall protective canopy area. An extent of the coverage is dependent, for example, on the type of crop which is covered.

The arranged solar cell module covers, for example, from 70% to 100% of an overall area of the ridge region.

For example, the solar cell module has a width of from 15 to 60 cm; for example, the solar cell module has a width of from 30 to 55 cm, for example 35 cm, or a width of 55 cm.

For example, the panel element projects laterally along one longitudinal edge or along both longitudinal edges of the solar cell module, that is to say on one side or both sides, by continuously 5 to 15 cm with respect to the respective longitudinal edge.

For example, the panel element projects on both sides on the longitudinal side beyond the longitudinal edges of the solar cell module continuously by 10 cm.

A length of the solar cell module corresponds, for example, to an overall length of the ridge region or the panel element present below it or an overall length of the ridge element.

In relation to an overall area of the protective canopy which is spanned over by way of the panel element of the protective canopy, the proportion of the overall area which is provided with the solar cell module is, for example, between 5 and 100% of the overall area of the protective canopy. In relation to the overall area of the protective canopy which is spanned over by way of the panel element of the protective canopy, for example, the proportion of the overall area which is provided with the solar cell module is, for example, 10%, for example 20%, for example 30%, for example 40%, for example 50%, or for example more than 50% of the overall area of the protective canopy.

The solar cell module comprises precisely one contiguous component or comprises a plurality of separate solar cell part modules such as, for example, a plurality of identical or different solar cell part modules. As a result, the individual solar cell part modules can be arranged on individually selectable or different regions of the panel element. For example, each solar cell part module can be attached or is attached releasably to the panel element by way of, for example, precisely one zipper unit, or by way of precisely two zipper units on the panel element or by way of more than two zipper units.

In accordance with one exemplary modification, a first zipper unit and a second zipper unit are provided with in each case two side parts and a slide, wherein there is one side part of the first zipper unit on the solar cell module along a first longitudinal edge of the solar cell module, and wherein there is one side part of the second zipper unit on the solar cell module along a second longitudinal edge of the solar cell module. As a result, a solar cell module can be arranged in a stable and secure manner on the panel element. Correspondingly, there are one side part of the first zipper unit and one side part of the second zipper unit on the panel element. The side parts are present on the panel element in their orientation and at a spacing from one another in accordance with the orientation and the spacing with respect to one another as on the solar cell module.

In accordance with one exemplary modification of the present invention, the zipper mechanism comprises a first zipper unit and a second zipper unit with in each case two side parts, wherein there is one side part of the first zipper unit on the panel element, and wherein there is one side part of the second zipper unit on the panel element spaced apart from the side part of the first zipper unit. As standard, a zipper unit additionally comprises a slide which acts in an opening and closing manner between the two side parts. For example, the side part of the first zipper unit and/or the side part of the second zipper unit are/is attached to the panel element by a joining method with a needle and thread or are/is sewn on by a thread or by a plurality of threads. For example, a side part is attached to the panel element by an adhesive bond and/or a welded bond, for example, a thermoplastic or plastic welded bond. The attachment by adhesive bonding or welding can take place as an alternative or in addition to the attachment by way of a sewn joined connection.

For example, the other side part of the first zipper unit is attached to a first edge such as a first longitudinal edge of the solar cell module. For example, the other side part of the second zipper unit is attached to a second edge such as a second longitudinal edge of the solar cell module.

The panel element has a first panel element portion which is present adjacently with respect to the ridge element and extends in the longitudinal direction of the ridge element, wherein the panel element comprises a second panel element portion which is present adjacently with respect to the first panel element portion, on a side of the first panel element portion which faces away from the ridge element, wherein the solar cell module is present on an outer side of the first panel element portion.

In this way, the positioning of the solar cell module at an advantageous or maximum height of the protective canopy is possible.

For example, the first panel element portion extends in a strip-shaped manner, for example, along an overall length of the ridge region. For example, the first panel element portion forms the ridge region, for example, on both sides of a longitudinal side of the ridge element. For example, the first panel element portion is inclined downward or inclined with respect to the horizontal from a side which faces the ridge element to a side which faces away from the ridge element. For example, a width of the first panel element portion transversely with respect to the longitudinal axis of the ridge element is between 40 and 70 cm. For example, a width of the first panel element portion is 55 cm. The second panel element portion has a width multiple times the width of the first panel element portion.

For example, the second panel element portion has a plurality of parallel strip-shaped portions each comprising an upper-side film element such as, for example, a film strip. For example, a film element or, for example, each film element is each present in a connected, for example, sewn, state along an upper longitudinal edge of the film element on a carrier, present below it, of the panel element such as, for example, a hail net. For example, end-side lateral edges which lie opposite one another and a lower longitudinal edge of the film element lie freely on the carrier.

For example, the carrier is present below the first panel element portion and the second panel element portion, for example, of all the plurality of film elements. The carrier, like the hail net, is, for example, continuously a uniform net element which is braced and is spread out flatly. For example, the spatial orientation of the stretched carrier defines the inclination of the first panel element portion and the second panel element portion and/or for all film elements.

As a rule, the second panel element portion extends as far as an eaves-side or lower longitudinal edge of the panel element or the protective canopy which can be defined in this way.

For example, the panel element comprises an outer film and a carrier, such as a net element, which is present below the film. For example, the film is a flexible flat film component. For example, the film is closed over the full area or is without holes or, for example, the film is not perforated. For example, the film is leakproof with respect to rain, snow and wind. For example, the film is made from a plastic material. For example, the film is translucent or transparent or partially transparent for components of the light or the sunlight. In the use state of the device, for example, the film forms an outer side of the panel element which is directed toward the atmosphere, such as an upper side of the panel element, for example, an outer side of the protective canopy.

For example, the carrier is perforated in a regular manner with a multiplicity of material-free openings or holes. For example, the carrier is a net element such as a textile flexible net element. For example, the net element is a protective hail net or a hail net and/or a protective insect net. For example, the net element is known from agricultural use, for example, for hail protection or insect protection of fruit crops such as, for example, cherry trees and the like.

Furthermore, another exemplary refinement results if the solar cell module comprises a flexible carrier material, to which one side part of a zipper unit is attached. For example, it is simply possible for the side part which is as a rule, for example, flexible to be sewn to the flexible carrier material of the solar cell module. For example, the carrier material of the solar cell module is a thin flexible material. For example, the carrier material is a film material. For example, the carrier material is a flat material such as a flat film material, plastic material or such as a flat textile or woven fabric material.

For example, the PV unit or the photoelectrically active layer or the photovoltaic the active layer of the solar cell module is present on the carrier material, for example, is attached to the latter or integrated into the latter.

For example, one side part of a zipper unit is present in a sewn manner, such as to the panel element or to a carrier material of the solar cell module. In the case of existing manufacturing devices and manufacturing methods for canopy systems with flexible panel elements, sewing devices are regularly used to connect or attach constituent parts. Sewing devices of this type can then also be used to produce the device according to the invention or a canopy system according to the present invention.

For example, a zipper side part is present in a manner which is sewn onto a film and/or a net fabric and the like.

For example, the side part of a zipper unit is sewn onto a film and a carrier material which is provided below it in, for example, precisely one sewing operation, wherein, for example, the panel element can at the same time be connected here to the carrier material and/or further parts of the device.

In accordance with one exemplary design, the solar cell module comprises an electrical contact point, wherein the device has a line portion which is fixed on a component of the device and is provided for making electrical contact with the electrical contact point of the solar cell module. A line portion of this type comprises, for example, an electrical cable. For example, a line portion is held on an existing portion of the device such as the supporting arrangement or on supports and/or a ridge element. For example, the line portion can be guided along these components from the outside on to the contact point of the solar cell module. For example, a connection which is electrically conducting and electrically insulated to the outside between the contact point and a power store or an energy or electrical network is possible.

For example, holding mechanisms are present in such a way as to hold a region of the panel element in a storage position, in order to temporarily arrange the region of the panel element in a non-covering arrangement in such a way that the region of the panel element is folded together or rolled together or gathered together upward in the direction of the ridge region in the storage position and is held below a panel element portion which is connected to the solar cell module, wherein the region of the panel element is covered in the storage position by the panel element portion which is connected to the solar cell module.

For example, in addition or as an alternative to the electrical energy generation, the solar cell module can fulfill a further function in the canopy system. For example, in winter, for example in the case of a non-configured canopy function of the protective canopy, that region of the panel element which is provided with the solar cell module serves in the manner of a covering for the remaining panel element if the latter is held, for example, in a folded-together or compact and compressed state, by way of the holding mechanism below the panel element region with the solar cell module. The solar cell module then forms, for example, a UV, temperature, rain and/or snow protection means or another mechanical and chemical material protection means for the panel element. At the same time, the advantageous energy generation function of the solar cell module for generating electrical energy from light energy is maintained, even in winter or fall, for example. For example, the holding mechanism comprises elongate elements such as, for example, elastic elements. For example, the holding mechanism comprises an elastic cord and/or a cable tie and/or a cable and/or a strap and/or a wire and/or a film or net strip or the like.

In accordance with one exemplary embodiment, the holding mechanism comprises an elongate flexible wraparound member, wherein the wraparound member can be arranged so as to wrap around on the outside on the folded-together or rolled-together region of the panel element in the storage position. The wraparound member can be subjected to a tensile load, for example. For example, the wraparound member has a hook element at one end, for hooking into a hook-in portion, for example, into a hook-in portion of the supporting arrangement or, for example, the ridge element or at the other end of the wraparound member. For example, the wraparound member is loop-shaped.

For example, the present invention relates to a device for attaching to a canopy device, wherein the canopy device serves to form a canopy over an outdoor region, such as cultivation areas for arable crops or agricultural crops, or other commercially exploited areas, wherein the canopy device comprises a panel element and a supporting arrangement with supports, and wherein the panel element which is supported by the supporting arrangement serves to form a flat protective canopy above the region.

For example, the device has a solar cell module which is connected to a retrofit panel element, wherein the device is configured as a retrofit arrangement for attaching the device to the canopy device in such a way that the retrofit panel element can be attached subsequently to the panel element of the canopy device.

For example, precisely one solar cell module is attached to a retrofit panel element of contiguous configuration. For example, a plurality of solar cell modules, for example, a plurality of identical solar cell modules, are attached to a retrofit panel element of contiguous configuration.

For example, the retrofit panel element which is provided with the solar cell module is configured in such a way that it can be attached to precisely one side, inclined obliquely from the ridge region, of the protective canopy. For example, the region with the solar cell module is present along a longitudinal axis of the retrofit panel element.

For example, the retrofit panel element which is provided with the solar cell module is configured in such a way that it is present on both sides of the ridge region. For example, the retrofit panel element which is provided with the solar cell module is configured in such a way that it covers the ridge region and respective downwardly adjoining portions of the protective canopy which is formed by the canopy device. The respective covered regions are in each case inclined, for example, inclined spatially to different extents, for example, at an identical angle with respect to the perpendicular. For example, two regions of the retrofit panel element with a solar cell module which are spaced apart and run in parallel are provided on a retrofit panel element of this type. There is a spacing in between the two solar cell module regions. In the attached state of the device to the canopy device, the spacing covers the ridge region of the canopy device which is present.

In this way, the solar cell module can advantageously be attached to an existing canopy device, for example, to a customary canopy device. The existing canopy device can advantageously be used permanently and/or temporarily for energy generation from sunlight.

For example, the (for example, retrospective) attachment of the retrofit panel element to the panel element of the canopy device which already exists takes place by way of attaching mechanisms such as, for example, quick action closure mechanisms. For example, the attaching mechanisms comprise, for example, zipper mechanisms and/or hook and loop fastener mechanisms and/or press stud fastening mechanisms and/or adhesives. For example, the retrospective attachment of the retrofit panel element to the panel element of the canopy device which already exists takes place by way of being sewn on.

For example, the retrospective attachment of the retrofit panel element to the panel element of the canopy device which already exists takes place by way of attaching mechanisms which are known or customary in the case of canopies such as canopies in agriculture such as in the field of the cultivation of arable crops or agricultural crops. This is economically and technically advantageous, for example, is also advantageous in terms of handling. For example, the attaching mechanisms relate to such means as are configured for the (for example, temporary or permanent) attachment of the retrofit panel element to the panel element of the canopy device.

For example, the attachment of the retrofit panel element which is provided with the solar cell module takes place to a canopy device which is already in the use state, for example, outdoors.

For example, the attachment of the retrofit panel element which is provided with the solar cell module takes place on an upper side or on top on a panel element which is present or on an upper side of a panel element of the existing canopy device. For example, the panel element of the existing canopy device is, for example, a film, a net, a hail net, a woven fabric and/or another flexible panel element.

For example, the retrofit panel element can be attached to a panel element of the existing canopy device, wherein the panel element is adjacent with respect to a ridge region of the existing canopy device in order to put a canopy over outdoor regions, for example, cultivation areas for arable crops or agricultural crops, or other commercially exploited areas, wherein the supporting arrangement can be anchored on a ground area of the region.

For example, the retrofit panel element is flexible, for example, can be rolled up and can be folded. For example, the retrofit panel element is strip-shaped, for example with a rectangular surface area.

For example, the retrofit panel element is a film, a net, a hail net, a woven fabric and/or another flexible panel element.

In the attached state on the canopy device, for example, the retrofit panel element extends over a (for example, upper or close to the ridge) part region of the protective canopy which is provided by the canopy device.

For example, in the attached state on the canopy device, the retrofit panel element extends, with a longitudinal side of the retrofit panel element running along on the ridge region, from the ridge region downward in the direction of an eaves region. For example, in the attached state on the canopy device, the retrofit panel element extends from the top as far as over approximately 20% of the entire width or height of a canopy side of the protective canopy of the canopy device. For example, a width of the (for example, strip-shaped) retrofit panel element is 0.1 meter, 0.2 meter, 0.3 meter, or from 0.4 meter to 0.6 meter, for example 0.5 meter, in relation to the left-hand or the right-hand side relative to a ridge element of the ridge region. For example, in the case of a contiguous configuration of the retrofit panel element beyond the ridge element and an extension on both sides with respect to the ridge region, the width of the retrofit panel element is, for example, from 0.2 to 1.2 meter. For example, a predominant proportion of the relevant panel side of the retrofit panel element is covered by the solar cell module. For example, from 10% to over 90%, for example, from 70% to 90%, for example 80% of the relevant panel side of the retrofit panel element is covered by the solar cell module.

For example, the solar cell module is connected releasably and/or non-releasably to the retrofit panel element. The connection of the solar cell module to the retrofit panel element is releasable or non-releasable.

For example, the retrofit arrangement comprises quick action closure mechanisms for attaching the solar cell module to the retrofit panel element comprising zipper mechanisms with a zipper unit and/or comprising hook and loop fastener mechanisms and/or pressure fastener mechanisms.

For example, the solar cell module is sewn onto the retrofit panel element.

For example, the solar cell module is adhesively bonded to the retrofit panel element.

For example, the solar cell module has a rectangular surface area.

For example, the solar cell module is connected along its edges, for example, along opposite longitudinal edges, to or on the retrofit panel element.

For example, the retrofit panel element can be connected releasably and/or non-releasably to the panel element of the canopy device.

For example, the retrofit panel element can be connected to the panel element of the canopy device with the aid of a plaque. For example, the plaque comprises two elements, between which a portion of the retrofit panel element and a portion of the panel element of the canopy device are pressed together and fixed. Here, the two elements of the plaque are pressed against one another, in order to connect, between the two elements, the portion of the retrofit panel element and the portion of the panel element of the canopy device or the two layers lying on top of one another of these panel elements. For example, if the retrofit panel element is connected to the panel element of the canopy device with the aid of a plaque, the two elements of the plaque are pressed against one another and are connected fixedly to one another, for example, are connected fixedly to one another in a releasable manner.

For example, if the retrofit panel element is connected to the panel element of the canopy device with the aid of a plaque, the two elements of the plaque are latched mutually, are locked mutually, are hooked in mutually, or are sealed to one another or fixed on one another in some other way.

The portions of the retrofit panel element and the panel element of the canopy device can be connected to one another additionally or exclusively by way of threaded closure means.

The portions of the retrofit panel element and the panel element of the canopy device can be connected to one another additionally or exclusively by way of quick action closure mechanisms such as, for example, pressure fastener mechanism, zipper mechanism, hook and loop fastener mechanism.

The portions of the retrofit panel element and the panel element of the canopy device can be connected to one another additionally or exclusively by way of adhesive.

The portions of the retrofit panel element and the panel element of the canopy device can be connected to one another additionally or exclusively by way of being sewn on.

The portions of the retrofit panel element and the panel element of the canopy device can be connected to one another additionally or exclusively by way of plastic welding.

A canopy device which serves to put a canopy over an outdoor region, such as cultivation areas for arable crops or agricultural crops, or other commercially exploited areas, is proposed, comprising a panel element and a supporting arrangement with supports, wherein the panel element which is supported by the supporting arrangement serves to form a flat protective canopy above the region, wherein a portion of the panel element extends along a ridge region of the protective canopy, with a device as described above for a canopy device of this type.

In particular, a canopy device for putting a canopy over an outdoor region, such as cultivation areas for arable crops of agricultural crops, or other commercially exploited areas, is proposed, comprising a panel element and a supporting arrangement with supports, wherein the supporting arrangement can be anchored on a ground area of the region, and wherein the panel element which is supported by the supporting arrangement serves to form a flat protective canopy above the region, wherein a portion of the panel element extends along a ridge region of the protective canopy, with a device as described above for a canopy device of this type.

Another aspect of the present invention proceeds from a device for putting a canopy over an outdoor region, such as cultivation areas for arable crops or agricultural crops, or other commercially exploited areas, comprising a panel element and a supporting arrangement with supports, wherein the supporting arrangement can be anchored on a ground area of the region, and wherein the panel element which is supported by the supporting arrangement serves to form a flat protective canopy above the region, wherein a portion of the panel element extends along a ridge region of the protective canopy.

For example, a solar cell module is provided which is connected non-releasably to a first region of the panel element, with the result that light energy can be converted into electrical energy in the case of the irradiation of light onto the solar cell module, wherein the first region of the panel element is fastened in the ridge region, and wherein the first region of the panel element is additionally connected to a second region of the panel element for fastening in the ridge region. For example, the non-releasable connection is configured by adhesive bonding, plastic welding and/or sewing on. In this way, the rolled, folded or gathered region of the panel element can be fastened and held securely below the upper region of the panel element which is provided with the solar module, covered by the latter. The rolled, folded or gathered region of the panel element is therefore protected against weather influences, for example, in winter. Moving the relevant panel element, for example, into a storage facility is not required, which is economically and technically advantageous. In the following spring, the relevant region can be spread out again in a rapid and uncomplicated manner to form the protective canopy.

By way of example, the first region of the panel element is connected releasably to a ridge element of the ridge region. For example, clip connectors are suitable for the releasable connection for this purpose, such as, for example, plaques for orcharding canopies, cable ties, tensioning straps or expander straps or the like.

It is illustrative, moreover, that, in relation to an overall area of the solar cell module, a part area of the solar cell module of between 5% and 50% is covered by the hook and loop fastener mechanism. This means a respective strap. In this way, a stable and secure releasable connection of the solar cell module to the panel element is achieved. The panel element has the other straps of the hook and loop fastener mechanism, for example, in a corresponding area size.

BRIEF DESCRIPTION OF THE DRAWINGS

Further features and advantages of the present invention are explained in greater detail on the basis of exemplary embodiments which are shown in a highly diagrammatic manner.

DETAILED DESCRIPTION OF THE INVENTION

Figure 1:
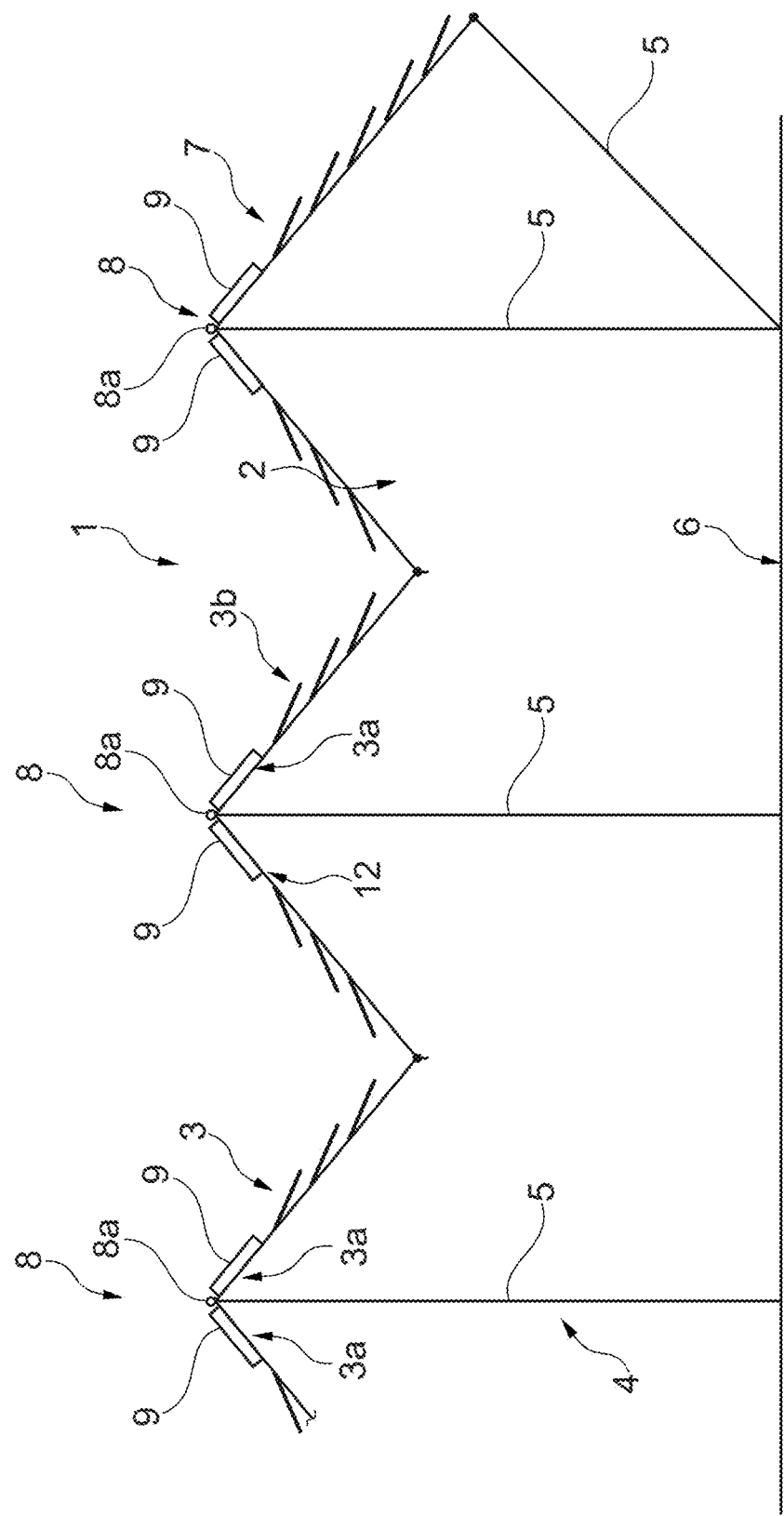
FIG. 1 shows a horizontal front view of a device for forming a canopy.
Figure 2:
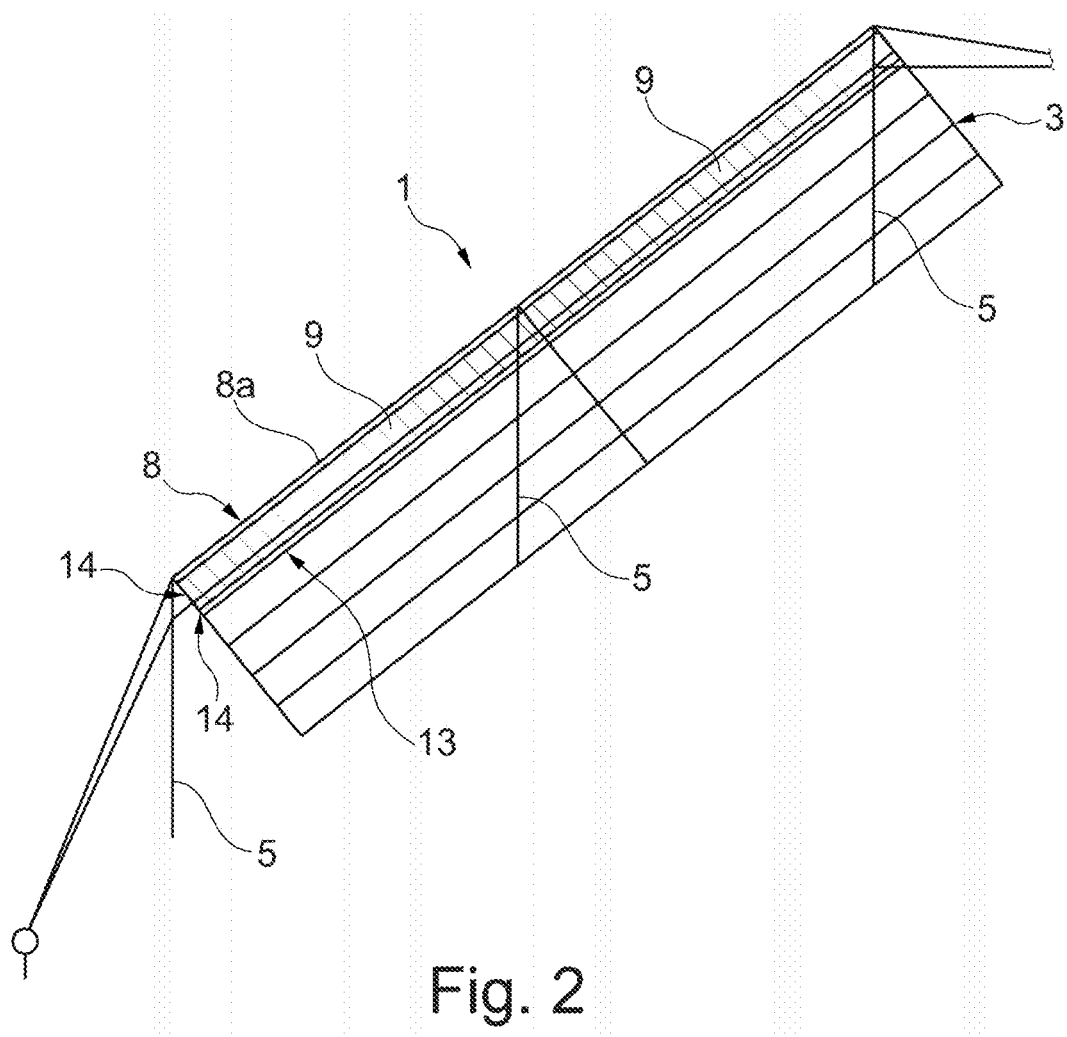
FIG. 2 shows a perspective view obliquely from above of a detail of a device for forming a canopy.

FIG. 1 shows a device 1 for putting a canopy over an outdoor region 2 such as, for example, cultivation areas for arable crops or agricultural crops, or other commercially exploited areas, comprising a panel element 3 and a supporting arrangement 4 with supports 5. For example, the supports 5 are configured as scaffolding poles.

The supporting arrangement 4 is or can be anchored on a ground area 6 of the region 2. The panel element 3 which is supported by the supporting arrangement 4 serves to form a flat protective canopy 7 above the region 2. A panel element portion 3a of the panel element 3 extends along a ridge region 8 of the protective canopy 7. The ridge region 8 has, for example, a ridge element 8a, for example a tensioned ridge wire.

For example, the multiply ridge roof-shaped protective canopy 7 has a plurality of parallel ridge regions 8. For example, one edge portion of the panel element 3 extends along a respective ridge region 8. In the example which is shown, each ridge region 8 is configured at an angle with part regions which taper toward one another in a ridge roof-shaped design of the protective canopy 7.

In the case of one alternative design of the protective canopy which is not shown and is curved outward or bent upward, the ridge region is bent on both sides toward a highest part of the protective canopy.

In the case of the device 1, a plurality of ridge regions 8 are provided with in each case two solar cell modules 9.

A respective solar cell module 9 is connected to the panel element 3, with the result that, in the case of light irradiation onto the solar cell module 9, light energy can be converted into electrical energy.

For example, quick action closure mechanism 10 comprising zipper mechanism 11 with a zipper unit 12 are provided, in order to arrange a solar cell module 9 on the panel element 3 releasably by way of the zipper mechanism 11.

For example, quick action closure mechanism 10 comprising hook and loop fastener mechanism 13 with a hook and loop fastener unit 14 are provided, in order to arrange a solar cell module 9 on the panel element 3 releasably by way of the hook and loop fastener mechanism 13.

Figure 3A:
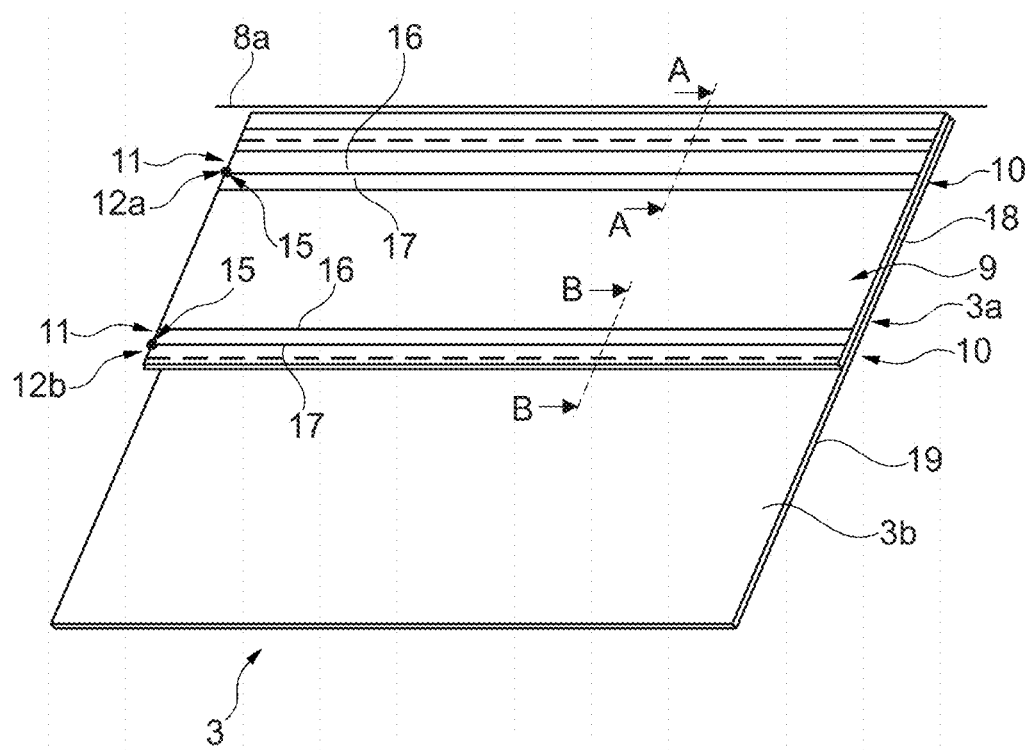
FIG. 3A shows an enlarged detail of a protective canopy of the device according to FIG. 2.

The zipper unit 12, for example, a first zipper unit 12a and a second zipper unit 12b, has a slide 15 and two elongate side parts 16, 17 which can be interlocked releasably with one another (see FIG. 3A).

Figure 3B:
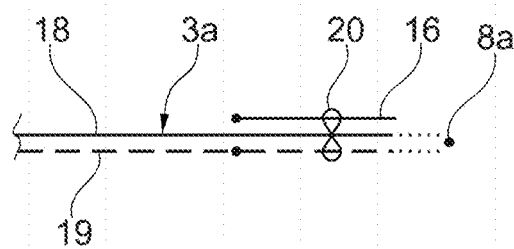
FIG. 3B shows a cross-section according to the section A-A in FIG. 3A through a detail of the protective canopy.
Figure 3C:
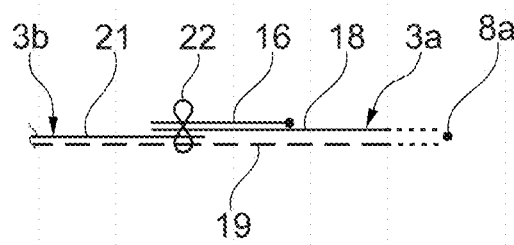
FIG. 3C shows a cross-section according to the section B-B in FIG. 3A through a detail of the protective canopy.

The attachment of, for example, a side part 16 by sewing onto the panel element 3 is illustrated by FIGS. 3B and 3C.

On an upper longitudinal edge, facing the ridge element 8a, of the first panel element portion 3a which is configured as a film strip or the portion 3a of the panel element 3, for example, according to the section A-A in FIG. 3A, a side part 16 is fixed so as to lie at the top on a strip-shaped film 18 of the portion 3a. The side part 16 is sewn by way of a sewing thread 20 to the panel element portion 3a and to the film 18 and a net element 19 which is present below it. The sewing thread 20 connects the side part 16 of the zipper unit 12a, the film 18 of the portion 3a and the net element 19 in a manner which reaches through them (see FIG. 3B). A side part 17 which belongs to the zipper unit 12a is sewn or adhesively bonded to the associated solar cell module 9, for example.

On a lower longitudinal edge, facing away from the ridge element 8a, of the first panel element portion 3a, configured as a film strip, of the panel element 3, for example, according to the section B-B in FIG. 3A, a side part 16 is fixed. The side part 16 is present above the film 18 of the panel element portion 3a, and is sewn by way of a sewing thread 22 to a film 21 of the strip-shaped second panel element portion 3b and the lowermost net element 19 which is present throughout. The seam or stitched connection connects an edge of the upper film 18 to the lower film 21, wherein the edges of the films 18 and 21 overlap in the seam region. The sewing thread 22 connects the side part 16 of the zipper unit 12, the film 18 of the portion 3a, the film 21 of the panel element portion 3b and the net element 19 in a manner which reaches through them (see FIG. 3C). A side part 17 which belongs to the zipper unit 12b is sewn or adhesively bonded to the associated solar cell module 9, for example.

Figure 6:
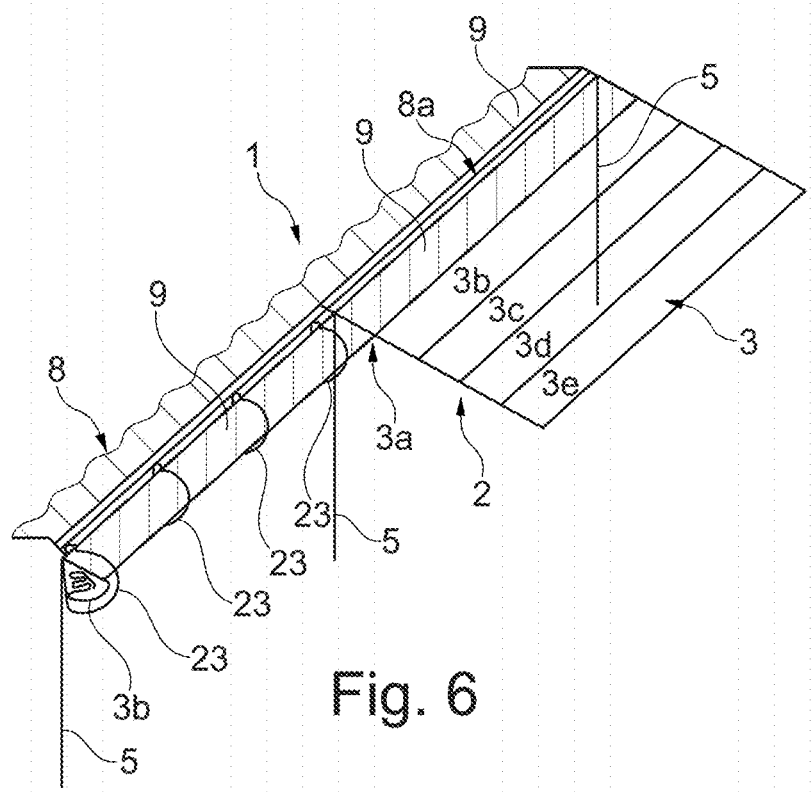
FIG. 6 shows a detail of a device for forming a canopy with a protective canopy which is partially folded together, in a perspective view obliquely from above.

FIG. 6 shows a device 1 in perspective and in detail.

Over the length along a ridge element 8a, the device 1 has the panel element portion 3a with the solar cell module 9 present above it continuously over the entire length and on both sides of the ridge element 8a.

Figure 8:
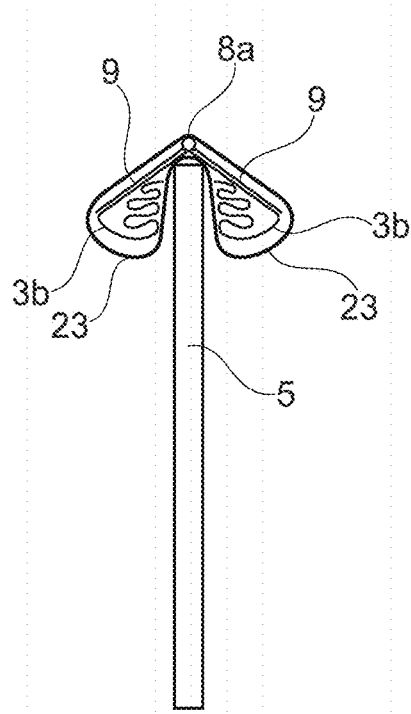
FIG. 8 shows the protective canopy according to FIG. 7 in a horizontal front view, in a state of a part of the protective canopy, in which it is folded together and held.

Over a part length of the remaining panel element, the panel element portion 3b and further strip-shaped panel element portions 3c, 3d and 3e form a region of the panel element 3 in a storage position according to FIG. 8 or front part in FIG. 6. In the storage position, the panel element portions 3b, 3c, 3d and 3e are held and folded together or laid together, and form a closed part of the protective canopy 7, for example, for winter storage. The closed part of the protective canopy 7 is reduced in volume and is situated in a held and protected manner below the panel element portion 3a with the solar cell module 9 (see FIG. 8, front part in FIG. 6).

Figure 7:
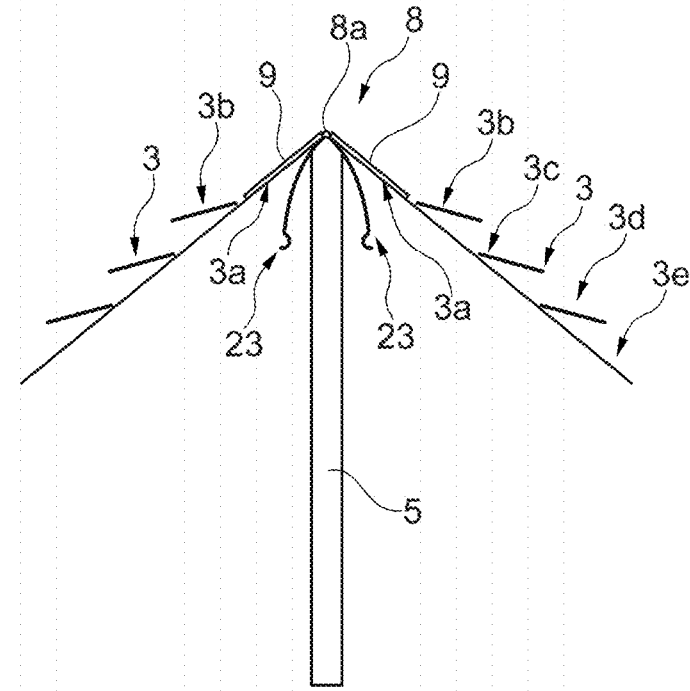
FIG. 7 shows a horizontal front view of a protective canopy which is spread out.

Another part of the protective canopy 7, comprising the stretched-out panel element portion 3a with the solar cell module 9 and a region with the spread-out further panel element portions 3b, 3c, 3d and 3e, is open in order to form a canopy over the region 2. FIG. 7 shows film strips, free on one side, of the film element portions 3b-3e in a manner which is deflected upward toward the net element 19, for example, brought about by wind.

All of the parts of the illustrated protective canopy 7 have the flat spatially obliquely oriented solar cell modules 9 in operation for energy generation.

Holding mechanism 23 are present for holding the region of the panel element 3, comprising panel element portions 3b, 3c, 3d and 3e, in the storage position in a wrapped-around manner, in order to arrange this region of the panel element 3 in a temporarily protected manner in a non-covering arrangement. The regions with the panel element portions 3b-3e including part of the net element 19 in the storage position are folded together or rolled together upward in the direction of the ridge region 8, and are held below the panel element portion 3a which is connected to the solar cell module 9.

The holding mechanism 23 comprise, for example, a winter storage strap such as, for example, an elastic strap with end-side hook-in means such as a rigid hook. For example, in the non-used state according to FIG. 7, the holding mechanism 23 hang loosely downward. The holding mechanism 23 are fastened to and, for example, can be hooked into the support 5 and/or the ridge element 8a, for example.

Figure 4:
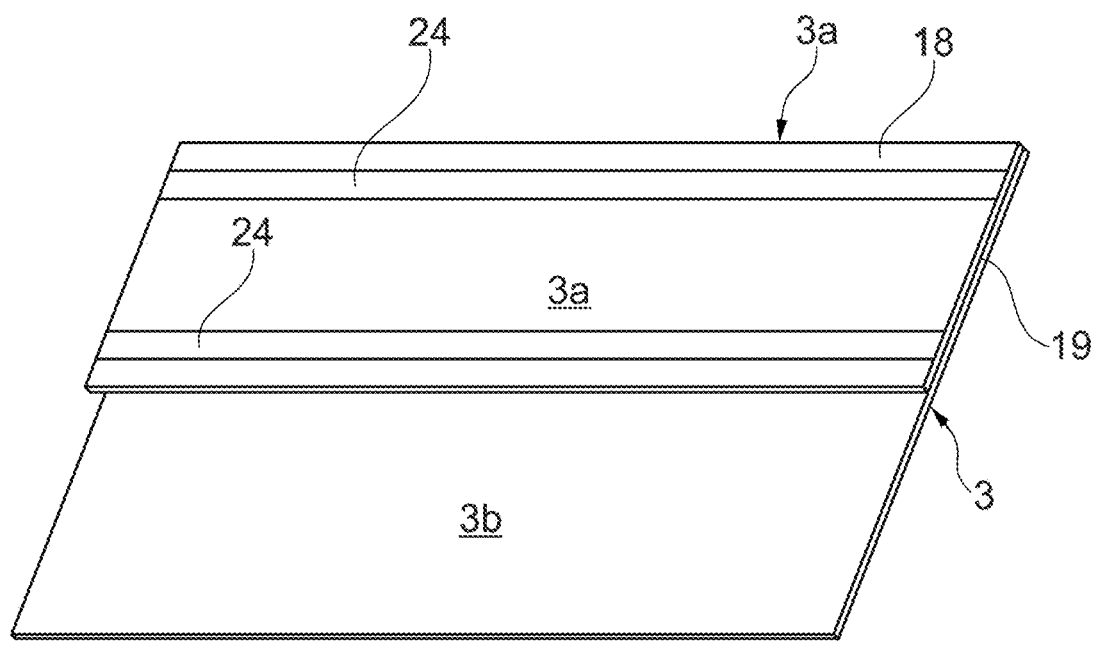
FIG. 4 shows, in the view according to FIG. 3A, a detail of a protective canopy of a device for forming a canopy which is an alternative to the device according to FIG. 2, wherein there is no solar cell module.
Figure 5:
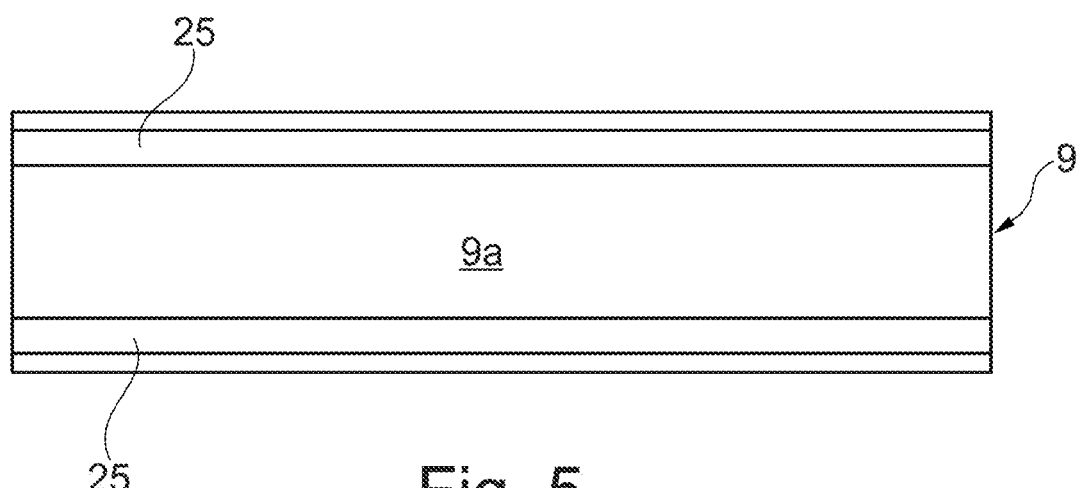
FIG. 5 shows a bottom view of a solar cell module which is consistent with the detail according to FIG. 4.

According to FIGS. 4 and 5, for example, a hook and loop fastener unit 14 comprises two flat flexible hook and loop strips, comprising a first hook and loop strip 24 and a second hook and loop strip 25. The hook and loop strips 24 and 25 can be interlocked releasably with one another in a reversible manner.

For example, the first hook and loop strip 24 is provided with flexible loops, for example, a fleece tape. For example, the second hook and loop strip 25 has small flexible barbs, for example, a hook strip.

For example, on the first panel element portion 3a according to FIG. 4, for example, on the film 18, an upper first hook and loop strip 24 and a lower first hook and loop strip 24 are, for example, sewn on, stitched, adhesively bonded, welded or attached in one piece to the panel element in a manner which is offset in parallel.

In relation to the hook and loop strips 24 on the panel element portion 3a, at a corresponding spacing on a lower side 9a of the solar cell module 9 according to FIG. 5, for example, on a lower-side carrier material, an upper second hook and loop strip 25 and a lower second hook and loop strip 25 are, for example, sewn on, stitched, adhesively bonded, welded or attached in one piece on the lower side 9*a* in a manner which is offset in parallel.

The solar cell module 9 can therefore be reversibly applied releasably to the lower side 9*a* in a manner which is oriented toward the upper side of the panel element portion 3*a* or presses on the film 18, and is held in a fixed manner. Each hook and loop strip 24 comes into interlocking pressing contact with an associated hook and loop strip 25.

Figure 9:
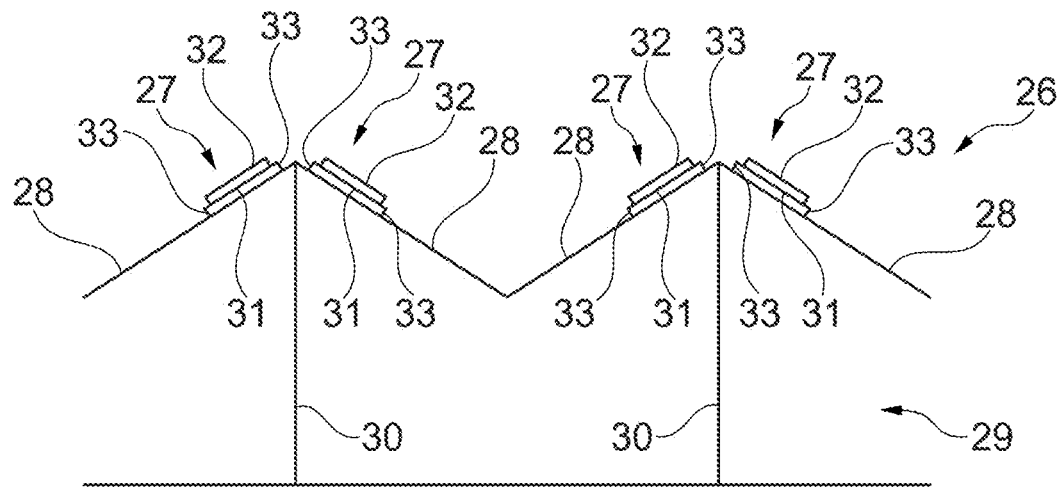
FIG. 9 shows a horizontal front view of a protective canopy, which is spread out, of a canopy device with a retrofit arrangement.

FIG. 9 greatly diagrammatically shows a canopy device 26 for forming a canopy over an outdoor region with four identical devices 27 which are configured as a retrofit arrangement. Accordingly, the canopy device 26 which is erected, for example, as an existing canopy device has a panel element 28 and a supporting arrangement 29 with supports 30. The panel element 28 which is supported by the supporting arrangement 29 forms a protective canopy. The panel element 28 forms four part regions of the protective canopy which are each oriented obliquely.

The devices 27 each have a retrofit panel element 31 with a solar cell module 32. The devices are each present on both sides along two ridge regions of the protective canopy.

The respective solar cell module is fastened, for example, releasably to the retrofit panel element 31, for example, by way of zipper and/or hook and loop fastener mechanism.

The retrofit panel element 31 is attached, for example, retrospectively to the protective canopy or the panel elements 28, for example, in a manner which is clamped fixedly, for example, by way of plaques 33.

Figure 10:
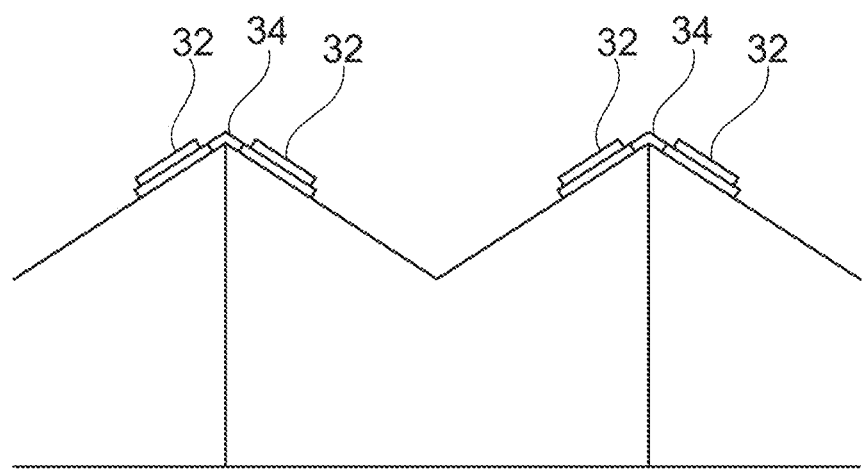
FIG. 10 shows a horizontal front view of an arrangement of a protective canopy, which is spread out, of a canopy device with an alternative retrofit arrangement.

The arrangement according to FIG. 10 differs from the arrangement according to FIG. 9 solely in that two rows of solar cell modules 32 which are present on both sides of a ridge line of a ridge region are attached to a common retrofit panel element 34, for example, by way of zipper and/or hook and loop fastener mechanisms.

The retrofit panel element 34 which is in each case of continuous configuration on the two illustrated ridge regions covers in each case the associated ridge line.

LIST OF DESIGNATIONS

1 Device
2 Region
3 Panel element
3*a*-3*e* Panel element portion
4 Supporting arrangement
5 Support
6 Ground area
7 Protective canopy
8 Ridge region
8*a* Ridge element
9 Solar cell module
9*a* Lower side
10 Quick action closure mechanism
11 Zipper mechanism
12 Zipper unit
12*a*, 12*b* Zipper unit
13 Hook and loop fastener mechanism
14 Hook and loop fastener unit
15 Slide
16 Side part
17 Side part
18 Film
19 Net element
20 Sewing thread
21 Film
22 Sewing thread
23 Holding mechanism
24 Hook and loop strip
25 Hook and loop strip
26 Canopy device
27 Device
28 Panel element
29 Supporting arrangement
30 Support
31 Retrofit panel element
32 Solar cell module
33 Plaque
34 Retrofit panel element

The invention claimed is:

1. An agricultural canopy system for arable crops, fruit and/or vegetables, and/or for forming a canopy over an outdoor region, or other commercially exploited areas, comprising a panel element and a supporting arrangement with supports, wherein the supporting arrangement can be anchored on a ground area of the region, and wherein the panel element which is supported by the supporting arrangement serves to form a flat protective canopy above the region, wherein a portion of the panel element extends along a ridge region of the protective canopy, wherein the supports which are spaced apart from one another extend in the vertical direction from below from the ground area as far as into the ridge region, wherein, in the ridge region, a ridge element, elongate transversely with respect to the vertical, of the supporting arrangement is present in the ridge region offset vertically with respect to the ground area, wherein a solar cell module is provided which is connected to the panel element, with the result that light energy can be converted into electrical energy in the case of the irradiation of light onto the solar cell module, wherein the solar cell module is present in a region of the agricultural canopy system which is adjacent with respect to the ridge element of the ridge region, wherein the panel element has a first panel element portion which is present adjacently with respect to the ridge element and extends in the longitudinal direction of the ridge element, wherein the panel element comprises a second panel element portion which is present adjacently with respect to the first panel element portion, on a side of the first panel element portion which faces away from the ridge element, wherein the solar cell module is present on an outer side of the first panel element portion, wherein the solar cell module is present adjacently with respect to the ridge element in a strip of the panel element which runs parallel to the ridge element, wherein the second panel element portion has a multiple width of the width of the first panel element portion, wherein the panel element can be rolled up and unrolled, wherein closure mechanisms are provided comprising a zipper mechanism with a zipper unit, in order to arrange a solar cell module on the panel element releasably by way of the zipper mechanism.

2. The agricultural canopy system according to claim 1, wherein the solar cell module is at least partially foldable, elastic, rollable and/or gatherable.

3. The agricultural canopy system according to claim 1, wherein the solar cell module is connected releasably to the panel element via an edge region of the solar cell module by means of the zipper mechanism.

4. The agricultural canopy system according to claim 1, wherein a zipper unit has a slide and two elongate side parts which can be hooked releasably to one another, wherein there is one side part of the zipper unit on the solar module, and there is another side part of the associated zipper unit on the panel element.

5. The agricultural canopy system according to claim 1, wherein the zipper mechanism comprises two zipper units which each function independently of one another for a releasable arrangement of the solar cell module on the panel element.

6. The agricultural canopy system according to claim 5, wherein two zipper units are provided in such a way that a releasable arrangement of opposite edges of the solar cell module on the panel element is configured.

7. The agricultural canopy system according to claim 1, wherein a first zipper unit and a second zipper unit are provided with in each case two side parts and a slide, wherein there is one side part of the first zipper unit on the solar cell module along a first longitudinal edge of the solar cell module, and wherein there is one side part of the second zipper unit on the solar cell module along a second longitudinal edge of the solar cell module.

8. The agricultural canopy system according to claim 1, wherein the zipper mechanism comprises a first zipper unit and a second zipper unit with in each case two side parts, wherein there is one side part of the first zipper unit on the panel element, and wherein there is one side part of the second zipper unit on the panel element spaced apart from the side part of the first zipper unit.

9. The agricultural canopy system according to claim 1, wherein the panel element comprises an outer film and a support including a net element which is present below the film.

10. The agricultural canopy system according to claim 1, wherein the solar cell module comprises a flexible-carrier material, to which one side part of a zipper unit is attached.

11. The agricultural canopy system according to claim 1, wherein one side part of a zipper unit is present in a sewn-on state, such as on the panel element or on a carrier material of the solar cell module.

12. The agricultural canopy system according to claim 1, wherein the solar cell module comprises an electrical contact point, wherein the agricultural canopy system has a line portion which is fixed on a component of the agricultural canopy system and is provided for making electrical contact with the electrical contact point of the solar cell module.

13. The agricultural canopy system according to claim 1, wherein the device has a solar cell module which is connected to a retrofit panel element, and wherein the device is configured as a retrofit arrangement for attaching the device to the agricultural canopy system in such a way that the retrofit panel element can be attached subsequently to a panel element of the agricultural canopy system.

14. The agricultural canopy system according to claim 13, wherein the solar cell module is connected releasably and/or non-releasably to the retrofit panel element by adhesive bonding, plastic welding and/or sewing on.

15. The agricultural canopy system according to claim 13, wherein the retrofit panel element can be connected releasably and/or non-releasably to the panel element of the canopy device such as, for example, by adhesive bonding, plastic welding and/or sewing on.

16. An agricultural canopy system for arable crops, fruit and/or vegetables, and/or for forming a canopy over an outdoor region, or other commercially exploited areas, comprising a panel element and a supporting arrangement with supports, wherein the supporting arrangement can be anchored on a ground area of the region, and wherein the panel element which is supported by the supporting arrangement serves to form a flat protective canopy above the region, wherein a portion of the panel element extends along a ridge region of the protective canopy, wherein the supports which are spaced apart from one another extend in the vertical direction from below from the ground area as far as into the ridge region, wherein, in the ridge region, a ridge element, elongate transversely with respect to the vertical, of the supporting arrangement is present in the ridge region offset vertically with respect to the ground area, wherein a solar cell module is provided which is connected to the panel element, with the result that light energy can be converted into electrical energy in the case of the irradiation of light onto the solar cell module, wherein the solar cell module is present in a region of the agricultural canopy system which is adjacent with respect to the ridge element of the ridge region, wherein the panel element has a first panel element portion which is present adjacently with respect to the ridge element and extends in the longitudinal direction of the ridge element, wherein the panel element comprises a second panel element portion which is present adjacently with respect to the first panel element portion, on a side of the first panel element portion which faces away from the ridge element, wherein the solar cell module is present on an outer side of the first panel element portion, wherein the solar cell module is present adjacently with respect to the ridge element in a strip of the panel element which runs parallel to the ridge element, wherein the second panel element portion has a multiple width of the width of the first panel element portion, wherein the panel element can be rolled up and unrolled, wherein action-closure mechanisms are provided comprising a hook and loop fastener mechanism with a hook and loop fastener unit, in order to arrange a solar cell module on the panel element releasably by way of the hook and loop fastener mechanism.

17. The agricultural canopy system according to claim 16, wherein the closure mechanisms further comprise a zipper mechanism with at least one zipper unit, in order to arrange a solar cell module on the panel element releasably by way of the zipper mechanism.

18. The agricultural canopy system according to claim 16, wherein the solar cell module is connected releasably to the panel element via an edge region of the solar cell module by means of the hook and loop fastener mechanism.

19. The agricultural canopy system according to claim 17, wherein the at least one zipper unit has a slide and two elongate side parts which can be hooked releasably to one another, wherein there is one side part of the at least one zipper unit on the solar module, and there is another side part of the associated at least one zipper unit on the panel element.

20. The agricultural canopy system according to claim 19, wherein the zipper mechanism comprises two zipper units which each function independently of one another for a releasable arrangement of the solar cell module on the panel element.

21. The agricultural canopy system according to claim 16, wherein the panel element comprises an outer film and a support including a net element which is present below the film.

22. The agricultural canopy system according to claim 16, wherein the solar cell module comprises a carrier material, to which one side part of a zipper unit is attached.

23. The agricultural canopy system according to claim 16, wherein the solar cell module comprises an electrical contact point, wherein the agricultural canopy system has a line portion which is fixed on a component of the agricultural canopy system and is provided for making electrical contact with the electrical contact point of the solar cell module.

24. The agricultural canopy system according to claim 16, wherein the device has a solar cell module which is connected to a retrofit panel element, and wherein the device is configured as a retrofit arrangement for attaching the device to the agricultural canopy system in such a way that the retrofit panel element can be attached subsequently to a panel element of the agricultural canopy system.

\* \* \* \* \*